United States Patent
Towler et al.

(10) Patent No.: US 6,409,974 B1
(45) Date of Patent: Jun. 25, 2002

(54) WATER GAS SHIFT PROCESS AND APPARATUS FOR PURIFYING HYDROGEN FOR USE WITH FUEL CELLS

(75) Inventors: Gavin P. Towler, Barrington; Kurt Vanden Bussche, Lake in the Hills, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/210,306

(22) Filed: Dec. 11, 1998

(51) Int. Cl.[7] .......................... B01D 50/00; B01J 10/00; B01J 8/02
(52) U.S. Cl. ....................... 422/172; 422/171; 422/194; 422/195; 422/220; 48/198.3; 48/198.6
(58) Field of Search ................................. 422/172, 171, 422/194, 192, 191, 220, 188, 195; 48/198.3, 198.6; 261/96, 97, 98; 423/656, 655

(56) References Cited

U.S. PATENT DOCUMENTS

| | | | |
|---|---|---|---|
| 2,465,235 A | * 3/1949 | Kubicek | |
| 2,512,562 A | * 6/1950 | Cummings | |
| 3,345,136 A | * 10/1967 | Finneran, Jr. et al. | |
| 3,592,613 A | * 7/1971 | Boyd | |
| 3,746,515 A | * 7/1973 | Friedman | |
| 4,157,241 A | 6/1979 | Samuelson | 431/353 |
| 4,479,925 A | 10/1984 | Shires et al. | 423/359 |
| 4,669,890 A | * 6/1987 | Peyrot | |
| 4,746,329 A | 5/1988 | Christner et al. | 48/61 |
| 4,909,808 A | 3/1990 | Voecks | 48/94 |
| 4,925,456 A | 5/1990 | Egglestone | |

(List continued on next page.)

FOREIGN PATENT DOCUMENTS

| | | |
|---|---|---|
| EP | 199878 A2 | 12/1985 |
| EP | 0-450-872 B1 | 3/1991 |
| WO | WO 97/44123 | 5/1997 |

OTHER PUBLICATIONS

Wnek, Gary E.; Rider, Jeffrey N.; Serpico, Joseph M.; Einset, Alison G., Ehrenberg, Scott G.; and Raboin, Louis A., "New Hydrocarbon Proton Exchange Membranes Based On Sulfonated Styrene–Ethylene/Butylene–Styrene Triblock Copolymers," *Electrochemical Society Proceedings*, vol. 95–23, pp. 247–251.

*Primary Examiner*—Walter D. Griffin
*Assistant Examiner*—Alexa A. Doroshenk
(74) *Attorney, Agent, or Firm*—John G. Tolomei; James C. Paschall

(57) ABSTRACT

A process and apparatus are disclosed for the operation of a compact water gas shift reactor for use in conjunction with fuel cell to generate electric power from a feed stream comprising a hydrocarbon or an alcohol. The fuel cell comprises a proton exchange membrane which produces electric power from a hydrogen product stream which comprises essentially no carbon monoxide. The hydrogen product stream may produced from the feed stream in a steam reforming of autothermal reforming zone. The compact water gas shift reactor comprises a vertically aligned vessel having a top end, a bottom end opposite, which defines an interior space. The interior space contains a first water spray zone for contacting a reforming effluent stream comprising hydrogen with a first water stream. A first dispersion zone is disposed below the first water spray zone and above a high temperature shift zone. The high temperature shift zone contains a high temperature shift catalyst to produce a high temperature shift effluent stream. A second water spray zone is disposed below the high temperature shift zone and above a second dispersion zone. A low temperature shift zone is disposed below the second dispersion zone. The low temperature shift zone contains a low temperature shift catalyst to produce a water saturated hydrogen product stream which comprises less than 50 ppm-mol carbon monoxide. The water dispersion zones simplify the overall shift reaction zone and provide protection for the shift catalysts from temperature shock.

8 Claims, 5 Drawing Sheets

U.S. PATENT DOCUMENTS

| | | | |
|---|---|---|---|
| 5,110,559 A | 5/1992 | Kondo et al. | 422/109 |
| 5,181,937 A | 1/1993 | Karafian et al. | 48/95 |
| 5,330,727 A * | 7/1994 | Trocciola et al. | 422/177 |
| 5,458,857 A | 10/1995 | Collins et al. | 422/198 |
| 5,464,606 A * | 11/1995 | Buswell et al. | 423/655 |
| 5,484,577 A | 1/1996 | Buswell et al. | 422/211 |
| 5,811,065 A | 9/1998 | Sterenberg | 422/198 |
| 5,907,076 A * | 5/1999 | Ou et al. | 585/800 |

* cited by examiner

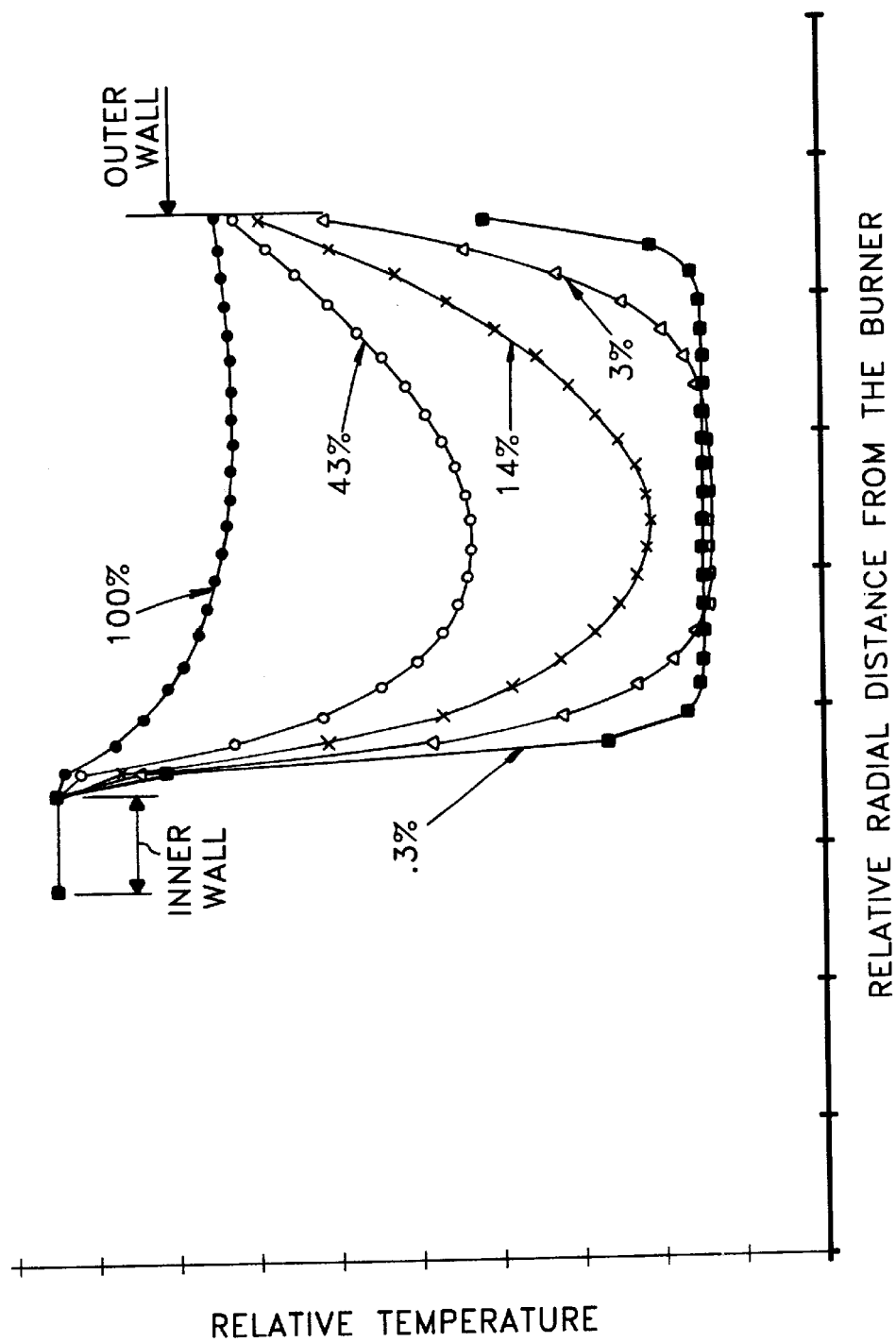

WATER GAS SHIFT PROCESS AND APPARATUS FOR PURIFYING HYDROGEN FOR USE WITH FUEL CELLS

FIELD OF THE INVENTION

The present invention relates to a hydrogen generating process and apparatus and, more particularly, to a water gas shift reactor which is suitable for use as a hydrogen purification system or as an electric power generation system when used in conjunction with a fuel cell.

BACKGROUND OF THE INVENTION

Fuel cells are chemical power sources in which electrical power is generated in a chemical reaction. The most common fuel cell is based on the chemical reaction between a reducing agent such as hydrogen and an oxidizing agent such as oxygen. The consumption of these agents is proportional to the power load. Because hydrogen is difficult to store and distribute and because hydrogen has a low volumetric energy density compared to fuels such as gasoline, hydrogen for use in fuel cells will have to be produced at a point near the fuel cell, rather than be produced in a centralized refining facility and distributed like gasoline.

Hydrogen is widely produced for chemical and industrial purposes by converting materials such as hydrocarbons and methanol in a reforming process to produce a synthesis gas.

Synthesis gas is the name generally given to a gaseous mixture principally comprising carbon monoxide and hydrogen, but also possibly containing carbon dioxide and minor amounts of methane and nitrogen. It is used, or is potentially useful, as feedstock in a variety of large-scale chemical processes, for example: the production of methanol, the production of gasoline boiling range hydrocarbons by the Fischer-Tropsch process and the production of ammonia.

Processes for the production of synthesis gas are well known and generally comprise steam reforming, auto-thermal reforming, non-catalytic partial oxidation of light hydrocarbons or non-catalytic partial oxidation of any hydrocarbons. Of these methods, steam reforming is generally used to produce synthesis gas for conversion into ammonia or methanol. In such a process, molecules of hydrocarbons are broken down to produce a hydrogen-rich gas stream.

Modifications of the simple steam reforming processes have been proposed. In particular, there have been suggestions for improving the energy efficiency of such processes in which the heat available from a secondary reforming step is utilized for other purposes within the synthesis gas production process. For example, processes are described in U.S. Pat. No. 4,479,925 in which heat from a secondary reformer is used to provide heat to a primary reformer.

The reforming reaction is expressed by the following formula:

$$CH_4 + 2H_2O \rightarrow 4H_2 + CO_2$$

where the reaction in the reformer and the reaction in the shift converter are respectively expressed by the following formulae (1) and (2)

$$CH_4 + H_2O \rightarrow CO + 3H_2$$

$$CO + H_2O \rightarrow H_2 + CO_2$$

In the conventional hydrogen generating apparatus, an inert gas heated in a reformer is made to flow through a process flow path so as to raise temperatures of the shift converter and the heat exchangers which are downstream from the reformer.

U.S. Pat. No. 5,110,559 discloses an apparatus for hydrogen generation which includes a reformer and a shift converter each incorporating a catalyst wherein, during the start-up of the apparatus, reformer combustion gas is introduced to a shift converter jacket surrounding the shift converter catalyst to heat the shift converter to provide a start-up or temperature rise of the reformer system.

U.S. Pat. No. 4,925,456 discloses a process and an apparatus for the production of synthesis gas which employs a plurality of double pipe heat exchangers for primary reforming in a combined primary and secondary reforming process. The primary reforming zone comprises at least one double-pipe heat exchanger-reactor and the primary reforming catalyst is positioned either in the central core or in the annulus thereof. The invention is further characterized in that the secondary reformer effluent is passed through which ever of the central core or the annulus is not containing the primary reforming catalyst countercurrently to the hydrocarbon-containing gas stream.

U.S. Pat. No. 5,181,937 discloses a system for steam reforming of hydrocarbons into a hydrogen rich gas which comprises a convective reformer device. The convective reformer device comprises an outer shell enclosure for conveying a heating fluid uniformly to and from a core assembly within the outer shell. The core assembly consists of a multiplicity of tubular conducts containing a solid catalyst for contacting a feed mixture open to the path of the feed mixture flow such that the path of the feed mixture flow is separated from the heating fluid flow in the outer shell. In the process, an auto-thermal reformer fully reforms the partially reformed (primary reformer) effluent from the core assembly and supplies heat to the core assembly by passing the fully reformed effluent through the outer shell of the convective reforming device.

Fuel cells are chemical power sources in which electrical power is generated in a chemical reaction. The most common fuel cell is based on the chemical reaction between a reducing agent such as hydrogen and an oxidizing agent such as oxygen. The consumption of these agents is proportional to the power load. Because hydrogen is difficult to store and distribute and because hydrogen has a low volumetric energy density compared to fuels such as gasoline, hydrogen for use in fuel cells will have to be produced at a point near the fuel cell, rather than be produced in a centralized refining facility and distributed like gasoline. Polymers with high protonic conductivities are useful as proton exchange membranes (PEM's) in fuel cells. Among the earliest PEM's were sulfonated, crosslinked polystyrenes. More recently sulfonated fluorocarbon polymers have been considered. Such PEM's are described in an article entitled, "New Hydrocarbon Proton Exchange Membranes Based on Sulfonated Styrene-Ethylene/Butylene-Styrene Triblock Copolymers", by G. E. Wnek, J. N. Rider, J. M. Serpico, A. Einset, S. G. Ehrenberg, and L. Raboin presented in the Electrochemical Society Proceedings (1995), Volume 95–23, pages 247 to 251.

The above processes generally relate to very large industrial facilities and the techniques for integrating the steps of converting the hydrocarbon or alcohol feedstream may not be useful in compact, small-scale hydrogen-producing units to power a transportation vehicle or to supply power to a single residence. One of the problems of large hydrogen facilities is the problem of methane slippage in steam reforming reactors. Methane slippage is a term used to describe a reduction in the methane conversion across the reforming reactor. Generally, the equilibrium conversion of methane to carbon oxides and hydrogen that is achieved in the reforming reactor increases with temperature. Consequently, a reduction in the reactor outlet temperature corresponds to a lower conversion of methane, or a methane slippage. Methane slippage reduces the overall production of hydrogen and hence the efficiency of the process. Methane slippage can create problems in downstream equipment such as in an oxidation step used to remove trace amounts of carbon monoxide from the hydrogen stream before passing the hydrogen stream to the fuel cell.

It is the objective of this invention to provide a compact apparatus for generating hydrogen from available fuels such as natural gas, hydrocarbons, and alcohols for use in a fuel cell to generate electric power.

It is an objective of this invention to provide an integrated fuel cell and hydrogen production system which is energy and hydrogen efficient.

SUMMARY OF THE INVENTION

The compact water gas shift apparatus of the present invention provides a simple and efficient system for enhancing the production of hydrogen from the effluent of a steam reforming process or an autothermal reforming process or a combination thereof. By disposing both the high temperature and the low temperature water gas shift reaction zones in a vertically aligned chamber and introducing the water for both cooling the feed and for the reaction as spray stream and providing dispersion zones to disperse the water spray into the effluent from the reaction zones, the feeds to the water gas shift reaction zones can be maintained at effective high and low water gas shift conditions without damaging the shift catalyst. Water gas shift catalyst can be damaged by direct contact with cold water and the use of the dispersion zones between the spray zones and the shift reaction zones solves this problem which on this small-scale unit reduces the complexity of the water gas shift reaction zones and provides an efficient means for controlling the temperature within the exothermic reaction zones. Furthermore, the cooling coil located in the low temperature shift reaction zone provides a means for controlling temperature excursions in the low temperature reaction zone when the temperature of the low temperature shift reaction zone exceeds about 70° C. to prevent damage to temperature sensitive downstream equipment such as the PEM fuel cell membrane. Furthermore, the cooling of the shift reactors by direct contact with water spray provides the product hydrogen stream at saturated conditions which is desirable to prevent the drying out of the PEM membrane.

In one embodiment, the present invention is an apparatus for a compact water gas shift reaction zone for removing carbon monoxide from a hydrogen stream for the production of electric power from a fuel cell. The apparatus comprises a vertically aligned vessel having a top end, a bottom end opposite and which defines an interior space. The vertically aligned cylindrical vessel defines a shift inlet at the top end, and a shift outlet at the bottom end. A first water spray nozzle in communication with a first water supply conduit is located within the interior space for contacting the hydrogen stream with a first water stream. A first dispersion material is retained in the interior space and is disposed below the first water spray nozzle to define the bottom of a first water spray zone. The first dispersion material defines a first dispersion zone in fluid communication with the water spray zone to disperse the first water stream into the hydrogen stream. A first fluid permeable portion defines the bottom of a high temperature shift zone in the interior space disposed below the first dispersion zone. The high temperature shift zone is in fluid communication with the first dispersion zone. The high temperature shift zone contains a high temperature shift catalyst to produce a high temperature shift effluent stream. A second water spray zone which is in fluid communication with the high temperature shift reaction zone and is defined by a portion of the interior space is disposed below the high temperature shift zone. The second water spray zone contains a second water spray nozzle in fluid communication with a second water supply conduit to contact the high temperature shift effluent stream with a second water stream. A second dispersion zone material is retained in the interior space below the second water spray zone and is in fluid communication with the second water spray zone to define a second dispersion zone. The second dispersion zone provides for dispersing the second water spray stream into the high temperature shift effluent stream. A low temperature shift zone is in fluid communication with the second dispersion zone and is defined by a portion of the interior space below the second dispersion zone and above said shift outlet. The low temperature shift zone contains a low temperature shift catalyst to produce a water saturated hydrogen product stream. The first dispersion zone and the second dispersion zone comprise dispersion material selected from the group consisting of sand, quartz, glass, alumina, and mixtures thereof. The first fluid permeable portion comprises a screen composed of a 304, 316, or similar alloy of stainless steel. The vessel comprises a 304, 316, or similar alloy of stainless steel.

In another embodiment, the present invention is a compact water gas shift process for removing carbon monoxide from a hydrogen stream in the production of electric power from a fuel cell. The water shift process comprises passing a feed stream comprising hydrogen and carbon monoxide to a first water spray zone. In the first water spray zone the feed stream is directly contacted with a first water spray stream to cool the reactor effluent stream to effective high temperature shift conditions and to provide a high temperature shift reactor feed admixture. The high temperature shift reactor feed admixture is passed through a first dispersion zone to uniformly disperse the first water spray in the high temperature shift reactor feed stream to provide a dispersed high temperature shift reactor feedstream. The dispersed high temperature shift reactor feedstream is passed to a high temperature shift reaction zone, containing a high temperature shift catalyst, to provide a high temperature shift effluent stream. The high temperature shift effluent stream is passed to a second water spray zone wherein the high temperature shift effluent stream is directly contacted with a second water spray stream to cool the high temperature shift effluent to effective low temperature shift conditions and to provide a low temperature shift feed admixture. The low temperature shift feed admixture is passed through a second dispersion zone to uniformly disperse the second water spray in the low temperature shift feed admixture and to provide a dispersed low temperature shift admixture. The dispersed low temperature shift admixture is passed to a low temperature shift reaction zone, containing a low temperature shift catalyst, wherein the low temperature shift reactor feed stream is reacted to produce a low temperature shift effluent stream. The low temperature shift effluent stream is withdrawn at a low temperature shift effluent temperature, at saturation conditions and having a carbon monoxide concentration less than about 3000 ppm-mol.

For an electrical output of about 7 kW, the present invention required a natural gas throughput of about 2.4 normal cubic meters per hour (about 1.4 standard cubic feet per minute) thus providing an overall energy efficiency of about 30 percent.

BRIEF DESCRIPTION OF THE DRAWINGS

FIG. 6 is a chart showing calculated radial temperature profiles of the present invention.

DETAILED DESCRIPTION OF THE INVENTION

Figure 1:
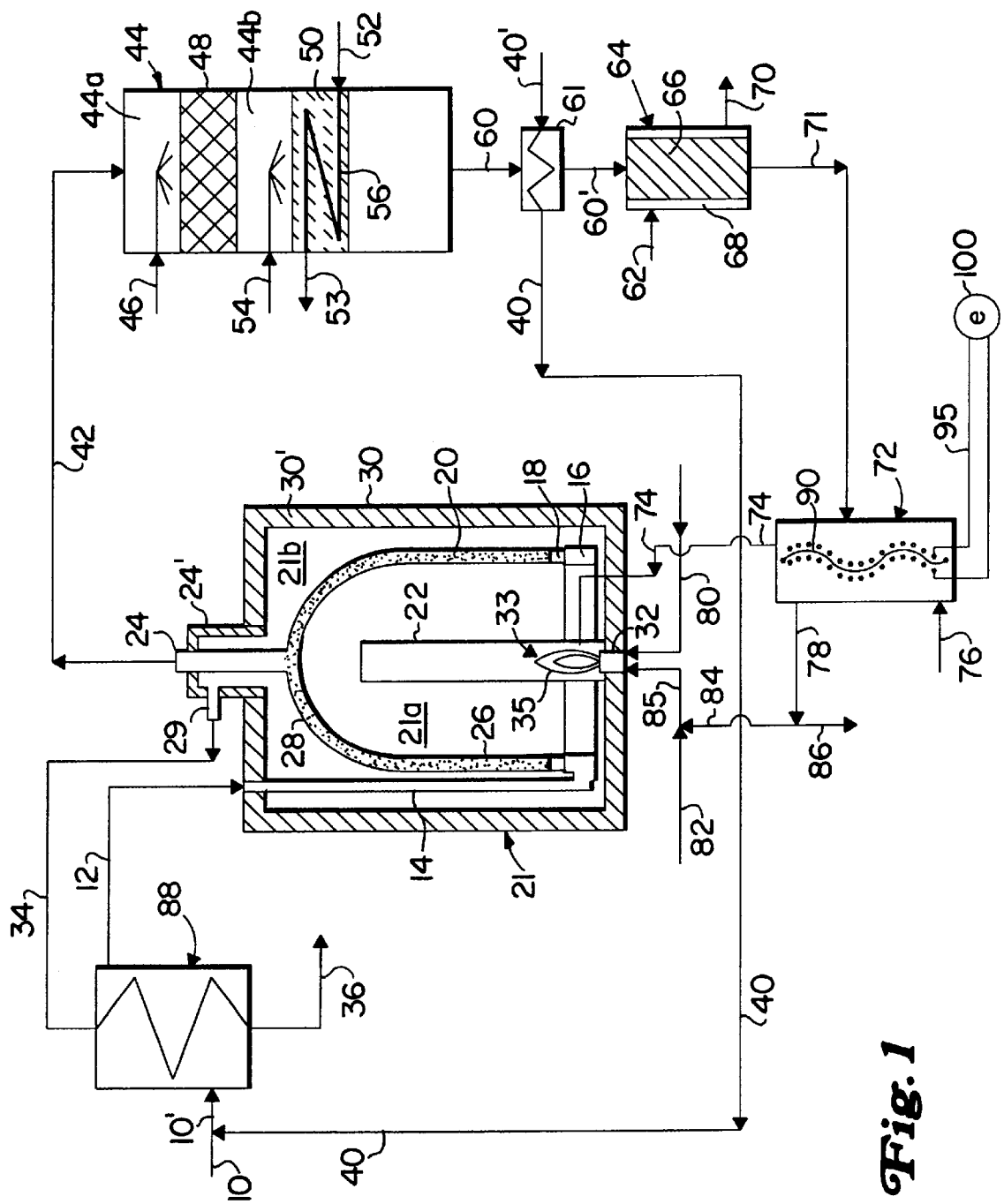
FIG. 1 is a schematic block flow diagram illustrating the process of the present invention.

Conventional steam reforming plants are able to achieve high efficiency through process integration; that is, by recovering heat from process streams which require cooling. In the conventional large-scale plant this occurs in large heat exchangers with high thermal efficiency and complex control schemes. In the present invention for the production of hydrogen for fuel cells it is desired to reach a high degree of process integration, with minimal equipment in order to reduce the size of the plants and the complexity of the control scheme.

The process of the current invention uses a hydrocarbon-containing gas such as natural gas as a feedstock. Natural gas, and similar hydrocarbon streams generally contain impurities such as sulfur in the form of hydrogen sulfide, mercaptans, and sulfur oxides which A must be removed prior to introducing the feedstock to the steam reforming zone. The removal of sulfur from the hydrocarbon feedstock may be accomplished by any conventional means including adsorption, chemisorption, and catalytic desulfurization. In order to reduce the overall size of the hydrogen generation equipment, chemisorption with a material such as zinc oxide is preferred. The desulfurization operation will generally take place at effective conditions including a desulfurization pressure of between about 100 to about 1000 kPa. Preferably the desulfurization operation is carried out at a desulfurization pressure of between 200 and 300 kPa. Preferably the desulfurization operation is carried out at a desulfurization temperature less than about 300° C., and more preferably the desulfurization operation is carried out at a desulfurization temperature between about 50° C. and about 300° C. Preferably the concentration of sulfur in the desulfurized feedstock will be less than about 10 ppm-mol, and more preferably the concentration of sulfur in the desulfurized feedstock will be less than about 1 ppm-mol. The feedstock is divided into two separate streams, the reforming feedstream and a burner fuel stream. The reforming feedstream is preferably desulfurized to provide a desulfurized feedstream. Optionally, the entire feedstock is desulfurized prior to dividing the feedstock into a desulfurized feedstream and a burner fuel stream which is also desulfurized.

Water is required by the steam reforming process for use as a reactant and as a cooling medium. In addition, the hydrogen product must be delivered to the fuel cell as a wet gas to avoid drying out the PEM membrane in the fuel cell. The water used in the steam reforming process preferably will be deionized to remove dissolved metals including sodium, calcium, lead, copper, arsenic, and anions such as chloride ions to prevent pre-mature deactivation of the steam reforming catalyst or other catalytic materials contained in the fuel cell, the water gas shift catalyst, or the carbon monoxide oxidation catalyst. The deionization of the water to be used in the process may be accomplished by any conventional means.

The steam reforming zone contains a steam reforming catalyst. Preferably, the steam reforming catalyst includes nickel with amounts of noble metal, such as cobalt, platinum, palladium, rhodium, ruthenium, iridium, and a support such as magnesia, magnesium aluminate, alumina, silica, zirconia, singly or in combination. More preferably, the steam reforming catalyst can be a single metal such as nickel or a noble metal supported on a refractory carrier such as magnesia, magnesium aluminate, alumina, silica, or zirconia, singly or in combination, promoted by an alkali metal such as potassium. Most preferably, the steam reforming catalyst comprises nickel supported on alumina and promoted by an alkali metal such as potassium. The steam reforming catalyst can be granular and is supported within the steam reforming zone within a dome shaped or bell-shaped catalyst zone between an inner wall and an outer wall of the bell-shaped catalyst zone which surrounds a combustion zone. Preferably the steam reforming zone is operated at effective reforming conditions including a reforming temperature of between about 650° C. and about 950° C. and a reforming pressure of between about 100 and 350 kPa.

The steam reforming reaction is an endothermic reaction and requires heat to maintain the equilibrium in the direction of converting methane or hydrocarbon to produce hydrogen. Heat is supplied to the steam reforming zone by burning a burner fuel stream in a combustion zone which transfers heat to the steam reforming reaction zone by radiation and convection. An oxygen-containing gas such as air and burner fuel gas mixture is contacted at effective combustion conditions to maintain a combustion zone temperature of between about 1200 and about 2000° C. The fuel and air are mixed in proportions to assure optimum combustion. Normally the mass flow rate of the fuel and air supplied to the burner is variable and governed thermostatically according to sensed combustion zone temperature. In the operation of the steam reforming zone in conjunction with the fuel cell of the present invention, the combustion zone temperature, and hence the amount of heat provided to the steam reforming reaction can be controlled by employing a portion of the anode waste gas which comprises hydrogen, nitrogen, and carbon dioxide to enhance the heating value of the burner fuel gas stream. The heat content of the anode waste gas, comprising hydrogen has a heat content on a molar basis significantly greater than the burner fuel gas stream and must be introduced into the flame zone above the burner. The flame zone is contained within a burner tube such as those disclosed in U.S. Pat. No. 4,157,241, which is hereby incorporated by reference. The temperature of the flue gas, monitored downstream of the flame zone, in a position shielded from radiant heat of the flame is employed to adjust the flow of air to the burner. A carbon monoxide monitor may also be placed in the flue gas stream to monitor the carbon monoxide content of the flue gas and adjust the air flow to the burner to maintain a condition of excess oxygen. In this manner, the hydrogen generated by the steam reforming reaction zone and not consumed by the fuel cell is not recycled to the reforming zone, but is burned to provide thermal integration of the overall process. Preferably at least 60 mole percent of the anode waste gas stream is combined with the burner fuel stream, and more preferably at least 80 percent of the anode waste gas stream is combined with the burner fuel stream, and most preferably at least 95 percent of the anode waste gas stream is combined with the burner fuel stream.

As a further means of controlling the temperature of the combustion zone, a portion of the cathode waste gas stream withdrawn from the fuel cell, which comprises nitrogen and a reduced oxygen content relative to air is admixed with the burner fuel. Preferably, less than about 20 mole percent of the cathode waste gas stream is combined with the oxygen-containing stream, and more preferably, between about 5 and about 20 percent of the cathode waste gas stream is combined with the oxygen-containing stream, and most preferably, between about 5 and about 15 percent of the cathode waste gas stream is combined with the oxygen-containing stream to control the temperature of the combustion zone. The addition of cathode waste gas to the burner during the operation of the process serves to reduce the efficiency of the combustion and thereby lower the temperature of the combustion zone.

The effluent withdrawn from the steam reforming zone comprises hydrogen, carbon dioxide, carbon monoxide, water, and methane. It is an objective of the process of the invention to maintain a low level of methane in the steam reforming effluent . Preferably, the steam reforming effluent will contain less than about 1 mole percent methane, and more preferably, the steam reforming effluent will contain less than about 0.5 mole percent methane. In order to obtain these very low methane levels, it is required to maintain a high exit temperature from the steam reforming zone. It is believed that this objective is accomplished by heating the steam reforming catalyst contained in the bell-shaped catalyst zone by direct radiation from the combustion tube, by convection of the fuel exhaust gases on the inside of the bell-shaped catalyst zone, and by convection of the fuel exhaust gases on the outside of the bell-shaped catalyst zone. It is believed that by these means the temperature profile radially at any point in the catalyst zone will be significantly more uniform than catalyst beds heated from To only one side. In addition, by maintaining a high steam reforming zone inlet temperature and a high outlet temperature, the equilibrium of the steam reforming reaction can be directed to the essentially complete conversion of methane or other hydrocarbon. By essentially complete conversion, it is meant that more than 95 percent of the hydrocarbon in the steam reforming zone feedstock is converted to water or hydrogen and carbon oxides.

The steam reforming effluent comprises about 5 to about 15 mole percent carbon monoxide. Because carbon monoxide acts as a poison to the PEM fuel cell, the carbon monoxide must be removed to produce a hydrogen product gas. This is accomplished by passing the steam reforming effluent to a series of shift reaction zones which exothermically react the carbon monoxide over a shift catalyst in the presence of an excess amount of water to produce carbon dioxide and hydrogen. In the present invention, the steam reforming effluent is passed to a first water spray zone to reduce the temperature of the steam reforming effluent to an effective high temperature shift temperature of between about 400° C. to about 450° C. and passing the cooled steam reforming effluent over a high temperature shift catalyst to produce a high temperature shift effluent. The high temperature shift catalyst is selected from the group consisting of iron oxide, chromic oxide, and mixtures thereof. The high temperature shift effluent is passed to a second water spray zone to reduce the temperature of the high temperature shift effluent to a temperature of between about 180° C. and about 220° C. to effective conditions for a low temperature shift reaction and to provide a cooled high temperature shift effluent. The cooled high temperature shift effluent is passed to a low temperature shift zone and contacted with a low temperature shift catalyst to further reduce the carbon monoxide and produce a low temperature shift effluent. The low temperature shift catalyst comprises cupric oxide (CuO) and zinc oxide (ZnO). Other types of low temperature shift catalysts include copper supported on other transition metal oxides such as zirconia, zinc supported on transition metal oxides or refractory supports such as silica or alumina, supported platinum, supported rhenium, supported palladium, supported rhodium, and supported gold. The direct water contacting of the steam reforming effluent and the high temperature shift effluent results in the production of a water saturated hydrogen product. This is desired to prevent damage to the PEM membrane in the fuel cell. Preferably a dispersion zone is provided between the first water spray zone and the high temperature shift zone and between the second water spray zone and the low temperature shift zone to facilitate the dispersion of the water spray with steam reforming effluent and the high temperature shift effluent, respectively. The low temperature shift reaction is a highly exothermic reaction and a portion of the heat of the low temperature shift reaction is removed by indirect heat exchange with a water stream to produce a preheated water stream. The preheated water stream at a temperature of about 100° C. to about 150° C. is admixed with the desulfurized reforming feedstream to further conserve thermal energy. The low temperature shift effluent comprising less than about 0.5 mol-% carbon monoxide is passed to a carbon oxide oxidation zone at effective oxidation conditions and contacted with an oxidation catalyst to produce a hydrogen product gas stream comprising less than about 40 ppm-mole carbon monoxide. Preferably, the hydrogen product gas stream comprises less than about 10 ppm-mole carbon monoxide, and more preferably, the hydrogen product gas stream comprises less than about 1 ppm-mole carbon monoxide. The heat of oxidation produced in the carbon oxide oxidation zone is removed in a conventional manner by cooling the carbon oxide oxidation zone in a convention means such as with a water jacket and a cooling water stream.

The hydrogen product gas comprising water at saturation and at a temperature less than about 100° C. is passed to the anode side of a fuel cell zone comprising at least one proton exchange membrane (PEM). The PEM membrane has an anode side and a cathode side, and is equipped with electrical conductors which remove electrical energy produced by the fuel cell when an oxygen containing stream is contacted with the cathode side of the PEM membrane. It is required that the PEM membrane be kept from drying out by maintaining the hydrogen product stream at saturation conditions. It is also critical that the PEM membrane be maintained at a temperature less thane 100° C. The PEM membrane is only about 70 percent efficient in its use of the hydrogen product stream and as a result, the fuel cell produces an anode waste gas comprising hydrogen and a cathode waste gas comprising oxygen. The anode waste gas produced by the present invention comprises less than about 50 mol-% hydrogen, and the cathode waste gas comprises less than about 15 mol-% oxygen.

The use of anode waste gas as a fuel for the process is disclosed by U.S. Pat. No. 4,746,329 when it is mixed with air and combusted to provide heat to a reforming zone. On the surface it appears to be advantageous to use the anode waste gas in this manner because the heat of combustion of the anode waste gas can be recovered; however, more careful consideration of the overall process performance reveals several problems. The combustion of anode waste gas in the combustion zone produces less flue or exhaust gas from the burner, but the burning of the anode waste gas produces high flame temperatures than from burning fuel gas. In the present invention the flue gas provides heat to the steam reforming reaction zone by convection from the flue exhaust gases and by high flame temperature radiation from the flame zone. Because of the relatively high proportion of heat that is released at high flame temperatures, problems can result. In fact, when the temperature in the flame zone becomes excessive, the process equipment can be damaged. Table 1 shows the efficiency of the process, defined as the lower heating value of the net hydrogen produced (i.e., hydrogen produced minus hydrogen returned in the form of anode waste gas) divided by the lower heating value of the methane expressed as a percent, and the hydrogen utilization of the fuel cell (i,e., the percent of the hydrogen which is converted in the fuel cell).

TABLE 1

PROCESS EFFICIENCY VS. HYDROGEN UTILIZATION

| HYDROGEN UTILI-ZATION PERCENT | NET HYDROGEN EFFICIENCY PERCENT |
| --- | --- |
| 60 | 56 |
| 70 | 62 |
| 80 | 63 |
| 90 | 65 |
| 100 | 66 |

Because the overall process efficiency is lower at lower values of hydrogen utilization, the more anode waste gas produced, the less efficient is the process. It is believed that for an improved operation, the formation of anode waste gas should be minimized and that the hydrogen utilization of the fuel cell should be increased. Furthermore, the concentration of hydrogen in the anode waste gas will vary depending upon the electrical load drawn from the fuel cell. This variation dynamically changes the heating value of the anode waste gas which can have a deleterious effect on process performance, particularly when the anode waste gas is used as the main component of the fuel for the process. Variation in the hydrogen content of the fuel also causes variation in the flame length, which can lead to loss of the flame, with serious implications for process safety. Thus, the direct disposal of the anode waste gas directly into a burner as fuel is fraught with difficulty. The control of the flame is difficult to maintain which results in wide temperature variations in the steam reforming zone.

According to the present invention, the problems associated with burning the anode waste gas can be overcome by the following means. The primary burner feed comprises a fuel stream of natural gas and an oxygen-containing/or oxidant stream containing an excess of air. The anode waste gas is provided directly into the flame zone formed by combustion of a burner fuel comprising natural gas. This ensures that there is always a steady flame to light off the hydrogen, even when the hydrogen concentration fluctuates. The performance can be further improved by replacing a portion of the oxygen-containing stream such as air with a portion of the cathode waste gas. The cathode waste gas is enriched in nitrogen relative to oxygen and saturated with water at a temperature of about 80° C. The cathode waste gas, therefore, has a high thermal capacity and low oxidation power. Use of the cathode waste gas as a secondary oxygen-containing stream considerably lowers the flame temperature. The amount of cathode waste gas produced is relatively constant, owing to the high concentration of nitrogen in air. According to the invention, the cathode waste uses a portion of this gas as oxidant, and therefore, serves to dampen variations in the flame length and flame temperature that would be experienced as a result of fluctuations in hydrogen concentration in the anode waste gas. It is not advisable to recycle all of the cathode waste gas to the burner, as taught by European publication EP 199 878A2, as this will cause excessive lowering of the flame temperature, as illustrated in Table 2, hereinbelow with calculated flame performance.

TABLE 2

EFFECT OF CATHODE WASTE GAS RECYCLE ON FLAME TEMPERATURE

| % CATHODE WASTE GAS RECYCLED | 0 | 5 | 10 | 15 | 20 | 50 | 100 |
| --- | --- | --- | --- | --- | --- | --- | --- |
| STOICHIOMETRIC FLAME TEMPERATURE C. | 1680 | 1534 | 1423 | 1318 | 1235 | 881 | 551 |

DETAILED DESCRIPTION OF THE DRAWINGS

Referring now to FIG. 1, a desulfurized fuel stream in line 10 is combined with a water stream in line 40 and passed to a the feed/effluent exchanger 88 wherein the desulfurized fuel stream is admixed with the water stream to form a fuel/water admixture 103 as the fuel/water admixture 103 is heat exchanged with a fuel exhaust stream in line 34 to at least partially heat the fuel/water admixture stream 103. The feed/effluent exchanger 88 comprises a multiple pass exchanger which permits the water stream to be admixed with the fuel stream as the admixture is heated by indirect exchange with a fuel exhaust stream. The fuel/water admixture stream is withdrawn in line 12 and a cooled fuel exhaust stream is withdrawn in line 36 and employed as a heat source for the desulfurization zone (not shown) or released to the atmosphere. The fuel/water admixture stream in line 12 at effective steam reforming conditions is passed to a feed inlet of a steam reforming zone 21. The steam reforming zone 21 comprises a hollow insulated chamber 303, containing a burner 32, a burner tube, or combustion tube 22, comprising a ceramic or metal tube surrounding the burner 32, a bell-shaped catalyst zone having a closed-end top, or reactor outlet 243 from which reforming reactor effluent is removed and an open-end base which functions as the steam reforming reaction zone inlet. The bell-shaped catalyst zone contains a reforming catalyst selective for the steam reforming of the feed water admixture. The bell-shaped catalyst zone is formed by an interior wall 26 and an exterior wall 28 defining an interior space and contains a steam reforming catalyst 20 between the inner wall 26 and the exterior wall 28 of the bell-shaped catalyst zone. It is preferred that the reforming catalyst not completely fill the interior space of the bell-shaped catalyst zone, but that the interior space contain an inert zone 18 comprising an open zone or an inert catalyst support material disposed at the open-end base of the bell-shaped catalyst zone. When the feed admixture contact the steam reforming catalyst, the endothermic nature of the reaction immediately drops the temperature at the reaction zone inlet. By extending the reaction zone inlet with an inert zone which is from about 1 to about 15 percent of the length of the reaction zone, a more stable reaction zone inlet temperature is maintained. The combustion tube 22 is disposed concentrically between the burner 32 and the inner wall 26 of the bell-shaped catalyst zone and forms a combustion zone 33 containing a flame zone 35 wherein a fuel stream entering from line 80 and an oxygenate-containing stream in line 85 are combusted to produce the fuel exhaust stream. The fuel exhaust stream exits the combustion zone 33 through the top of the burner tube 22 and enters an inner chamber 21a formed by an inner wall 26 of a bell-shaped catalyst zone and the burner tube 22. The bell-shaped catalyst zone completely surrounds and encloses the burner tube 22. In its simplest form the base of the catalyst zone is disposed on a feed distributor 16 which directs the fuel/water admixture to the base of the catalyst zone at the open-end of the bell-shaped catalyst zone. The fuel/water admixture in line 12 is passed through conduit 14 and the feed distributor 16 to react with the steam reforming catalyst 20 to produce a reforming reactor effluent stream. The reforming reactor effluent stream is removed from the bell-shaped catalytic zone via conduit 24, which is in fluid communication with the bell-shaped catalyst zone and which is located at the top or outlet of the bell-shaped catalytic zone. The fuel exhaust stream in the inner chamber 21a exchanges heat with the inner wall 26 to provide heat to the steam reforming catalyst 20 from the inside of the bell-shaped reaction zone. As the fuel exhaust exits the inner chamber 21a, and is passed under the feed distributor 16 into the outer space 21b formed between the outer wall 28 of the catalyst zone And the insulated wall 30 of the steam reforming zone 21, additional heat is provided to the reforming catalyst from the outer wall of the bell-shaped catalyst zone. Thus, the steam reforming catalyst 20 is heated both from the inside wall 26 and the outside wall 28 by the fuel exhaust steam to maintain effective steam reforming conditions and to provide an even heat distribution, radially through the bell-shaped catalyst zone. The fuel exhaust stream leaves the steam reforming zone 21 via conduit 29. Preferably conduit 29 is disposed in close proximity to conduit 24. The steam reforming reaction inside the bell-shaped catalyst zone is an endothermic reaction. By passing the fuel exhaust stream on both sides of the catalyst zone and providing the burner tube which extends the combustion zone to a point approaching the closed-end top, or outlet of the bell-shaped catalyst zone, a concave temperature profile from the inlet of the reaction zone to the outlet of the bell-shaped catalyst zone is established which is characterized by a first peak temperature at the inlet of the bell-shaped catalyst zone and a second peak temperature at the outlet of the bell-shaped catalyst zone. It is believed that this concave temperature profile, particularly a hot exit temperature, maintains the level of methane conversion to hydrogen at the steam reforming reactor outlet. In addition, the fuel exhaust stream heats the fuel/water admixture in conduit 14 by indirect heat exchange with the fuel/water admixture. The reforming reactor effluent is withdrawn from conduit 24 at the closed-end top of the bell-shaped catalyst zone as a reforming reactor effluent stream and the reforming reactor effluent stream is passed in line 42 to a shift reaction zone 44. The shift reaction zone 44 comprises a high temperature shift reaction zone 48 and a low temperature shift reaction zone 50 wherein the reforming reactor effluent undergoes a water gas shift reaction to favor the production of hydrogen. A second water stream in line 46 is introduced to the shift reaction zone 44 via line 46 at an upper portion of the shift reaction zone 44. Preferably, the second water stream in line 46 is admixed with the reforming reactor effluent by spraying the second water stream through a first water spray zone 44a and contacting the resulting first water/effluent admixture at effective high temperature shift conditions with a high temperature shift catalyst to produce a high temperature shift effluent. The high temperature shift effluent is contacted with a third water stream in line 54 in a second water spray zone 44b to form a high temperature shift/water admixture and the high temperature shift/water admixture is passed to a low temperature shift reaction zone 50. The low temperature shift reaction is an exothermic reaction. Cooling of the low temperature shift reaction zone 50 is provided by the third water stream in line 54. If required in emergency conditions, additional cooling is provided by a cooling coil 56 through which a fourth water stream in line 52 is passed to maintain the low temperature shift reaction at effective conditions to produce a low temperature shift effluent stream. A fifth water stream is withdrawn in line 53 and passed to a drain. The low temperature shift effluent stream comprising hydrogen, carbon monoxide, carbon dioxide, and nitrogen is passed via line 60 to a shift effluent cooler 61. In the shift effluent cooler the shift effluent stream in line 60 is cooled to effective oxidation conditions such as oxidation temperature 40° C. to 100° C. and an oxidation pressure less than about 2 atmospheres to produce an oxidation zone feedstream in line 60' by indirect heat exchange with a deionized water stream in line 40'. A preheated water stream which is now heated and partially vaporized is withdrawn from the shift effluent cooler 61 in line 40. The oxidation zone feedstream in line 60' is passed to a carbon monoxide oxidation zone 64. The carbon monoxide oxidation zone contains a carbon oxide oxidation catalyst 66 comprised of a noble metal selected from the group consisting of platinum, palladium, ruthenium, and mixtures thereof supported on alumina or some other suitable binder and is cooled in a conventional manner, shown here as with a water jacket 68 which permits a cooling water stream in line 62 to flow through the water jacket or cooling coil to maintain the carbon oxide oxidation catalyst at effective carbon oxide oxidation conditions to produce a hydrogen product stream in line 71 comprising hydrogen and less than about 100 ppm carbon monoxide. Water heated in the process of cooling the carbon monoxide oxidation zone 64 is removed as a heated water stream in line 70. The hydrogen product stream in line 71 is passed to a PEM fuel cell 72 which is maintained at a temperature of less than about 100° C. by a conventional cooling system (not shown). The hydrogen product stream comprising essentially pure hydrogen is contacted with the anode side of at least one PEM membrane 90 while the cathode side of the PEM membrane is contacted with an oxygen-containing stream such as air in line 76. The PEM membrane produces electrons which are removed by electrical connections 95 to provide electrical energy 100. A plurality PEM membranes may be connected in series or in parallel to obtain the desired amount of electrical energy. In the process of generating electricity with the PEM membrane, a portion of the hydrogen product stream is not consumed and is recovered as an anode waste gas stream in line 74. The anode waste gas stream is passed to the combustion zone 33 wherein it is injected into the flame zone 35. Similarly, a portion of the oxygen-containing stream in line 76 is recovered as a cathode waste gas stream in line 78. The anode waste gas which comprises hydrogen has a variable heat content which is generally higher than natural gas and which is effectively employed to enrich the natural gas which is supplied to burner 32 via line 80. The anode waste gas is injected into the flame zone 35 to provide a more reliable operation. The cathode waste gas which is somewhat depleted in oxygen relative to air is generally vented to the atmosphere via lines 78 and 86, but a portion of the cathode gas stream in line 78 may be employed to control the heat delivered to the steam reforming zone 21 by admixing at least a portion of the cathode waste gas stream in lines 78 and 84 with a fresh oxygen-containing stream in line 82 prior to passing the oxygen-containing stream in line 85 to the burner 32. A shielded temperature sensor located in the combustion zone 33 may be effectively employed to direct the amount of cathode waste gas in line 84 passed to the burner 32 via lines 84 and 85 to maintain effective stream reforming conditions and avoid overheating the steam reforming catalyst.

Figure 2:
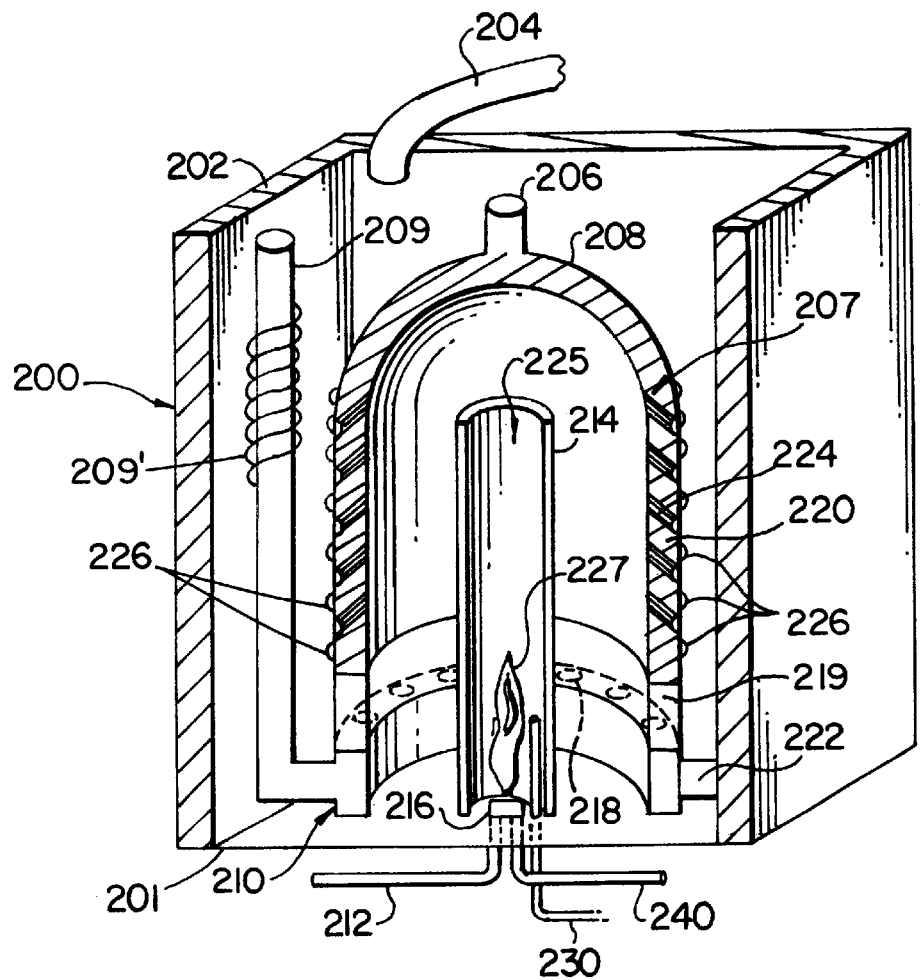
FIG. 2 is an isometric drawing providing an interior view of the steam reforming zone of the present invention.
Figure 3:
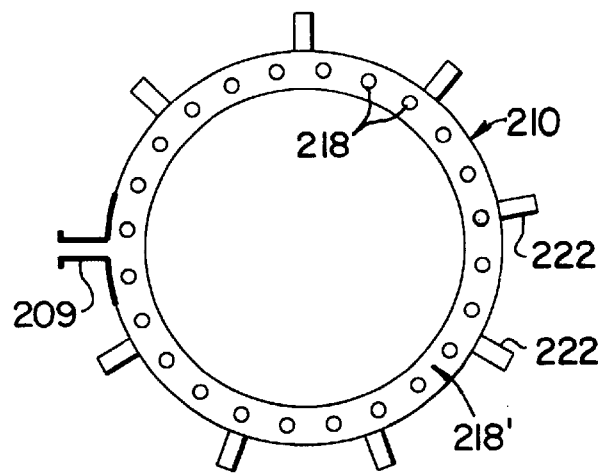
FIG. 3 illustrates the top plate of the feed distributor of the present invention.

FIG. 2, shows an isometric sectional view of a steam reforming zone 200. The steam reforming zone comprises a hollow insulated chamber having insulated walls 202 and a base 201 defining an interior chamber space. Within the interior chamber space and rigidly disposed on the base 201 of the steam reforming zone is a burner 216. The burner 216 is supplied with fuel and air by means of a fuel conduit 240 and an air conduit 212 in closed communication with the burner and being rigidly attached to the burner 216 from the exterior side of the base of the stream reforming zone 200. An anode waste gas conduit 230 disposed in the combustion zone 225 provides a means for supplying the anode waste gas stream directly into the flame zone 227 in the combustion zone 225. A cylindrical burner tube 214 made of metal or ceramic material is disposed on the base of the steam reforming zone fully surrounding the burner 216 and extending above the base of the steam reforming zone 200 to define a combustion zone. Preferably, the burner tube is fabricated of metal selected from the group consisting of a high nickel alloy, a super alloy, or a combustor alloy including, but not limited to, alloys selected from the group consisting of 214, 601, 600, 230, 617, 333, 671, 800H, RA330, 310, HK40, and H160. Preferably, the burner tube is fabricated from a metal or a ceramic material such as alumina, silican carbide, aluminum nitride, silicon nitride, or sialon. The shape of the burner tube may be altered to balance the ratio of radiant heat to convection heat transferred to the reactor. For example, the burner tube 214 may be slotted or may contain a plurality of holes to increase the amount of direct radiation; the burner tube may be coated to emit a particular range of radiation frequencies adsorbed by the exhaust gas, or transparent to the exhaust gas; the burner may comprise a concave or convex shape to direct radiation to a specific point of the interior wall of the bell-shaped catalyst zone; or the burner tube may comprise deflector shields to adsorb radiation and to provide heat to the exhaust gas by convection. A bell-shaped catalyst zone 220 having an exterior wall 208 and an interior wall 207, an outlet 206 at the closed-end top of the bell and an inlet at the open-end base of the bell, opposite, is disposed on a feed distributor 210 to form a bell-shaped catalyst zone. Preferably, the bell-shaped reactor is fabricated from a metal such as a high nickel alloy, a super alloy, or a combustor alloy including, but not limited to alloys 800H, HK40, and RA330. More preferably, the bell-shaped reactor is fabricated from a metal alloy selected from the group consisting of 800H, 214, and HK40. The structure of the feed distributor 210 is shown in FIG. 2 and FIG. 3 with the same reference numbers. The feed distributor is disposed at the bottom or inlet of the bell-shaped catalyst zone and is in closed communication with the exterior and interior walls 208 and 207 of the bell-shaped catalyst zone to separate the interior of the bell-shaped catalyst zone from the interior chamber space. A plurality of assembly supports 222 disposed on the feed distributor 210 provide support for the feed distributor above the base 201 of the steam reforming zone 200 to permit the flow of exhaust gases from the burner 216 to flow under the feed distributor 210 and on both sides of the bell-shaped catalyst zone. The assembly supports 222 may be rigidly attached to the base 201 of the steam reforming zone 200, or rigidly attached to the insulated walls 202 of the steam reforming zone 200, or attached to a combination of the insulated walls and the base of steam reforming zone 200. A cylindrical feed distributor 210 has a top surface 218' and a bottom surface. The top surface 218' has a plurality of openings 218, which may be holes or raised nipples, to place the feed distributor 210 in fluid communication with the interior of the bell-shaped catalyst zone. An inert zone 219, containing an inert catalyst support material such as glass, sand, or ceramic material, or containing no material is provided between the feed distributor and the catalyst in the bell-shaped catalyst zone to improve the distribution of the fuel/water admixture to the catalyst zone and to provide a final heating zone prior to contacting the fuel/water admixture with the catalyst. A feed conduit 209 is disposed in the interior chamber space and rigidly attached to the feed distributor 210. The feed conduit 209 is in fluid communication with the feed distributor 210. The passage of exiting fuel exhaust from the burner 216 through the interior chamber space and on the outside surface of the feed conduit further heats the feed/water admixture. The outside surface of the feed conduit may be an extended surface 209' having fins or surface extensions to improve the transfer of heat to the feed/water admixture. At the closed-end top of the bell-shaped catalyst zone a reforming effluent outlet 206 is disposed on the exterior wall 208 to remove the products of the steam reforming reaction from the bell-shaped catalyst zone. A fuel exhaust outlet 204 is disposed at the top of the interior chamber space to remove the fuel exhaust stream from the interior chamber space. Preferably the fuel exhaust outlet is disposed at the top of the interior chamber space in close proximity to the reforming effluent outlet 206. To improve the contact of the feed/water admixture within the bell-shaped catalyst zone, a plurality of reactor surface extensions 224 selected from the group consisting of fins, angled vanes, indentations, and combinations thereof are disposed on an inside surface of the exterior wall having an inside surface and an outside surface of the bell-shaped catalyst zone. The reactor surface extensions improves the gas mixing at the wall within the catalyst zone. Preferably, the spacing between the surface extensions are equal to or greater than the path length required to develop a heat transfer boundary layer. Similarly, a plurality of outer surface extensions 226 selected from the group consisting of fins, angled vanes, or indentations are disposed on the outside surface of the exterior wall 208 of the bell-shaped catalyst zone to improve the heat transfer between the exhaust gas stream and the exterior wall of the bell-shaped catalyst zone.

Figure 4:
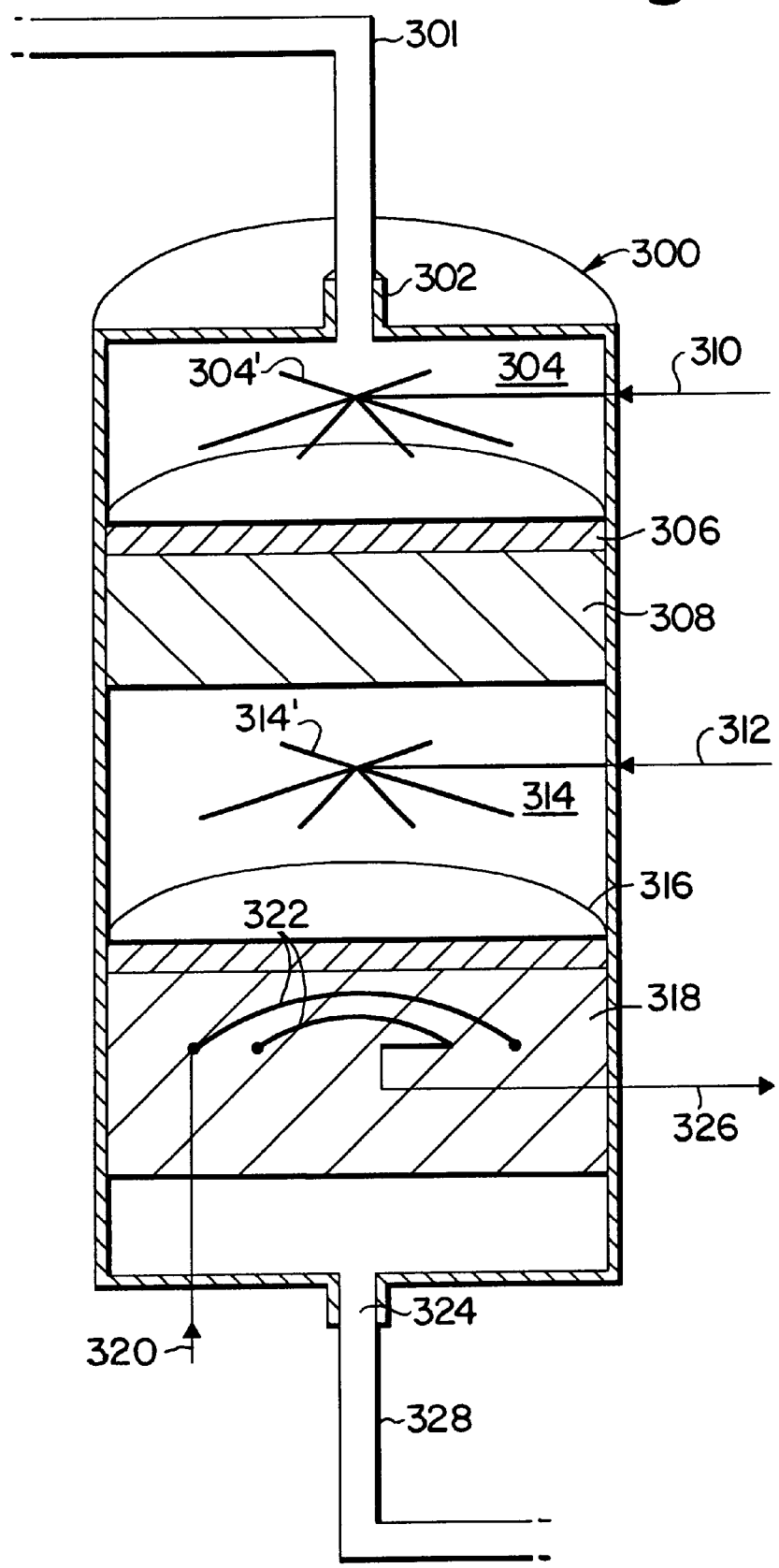
FIG. 4 is an isometric drawing showing a cross section of the shift reaction zone of the present invention.

FIG. 4 illustrates an isometric sectional drawing of a shift reaction zone 300. The stream reforming effluent enters the shift reaction zone 300 via conduit 301 and shift inlet 302. The shift reaction zone 300 comprises a vertically aligned series of water mixing zones and shift catalyst zones to produce additional hydrogen and to reduce the amount of carbon monoxide in the shift reactor effluent. In one embodiment, shift reaction zone 300 comprises a vertically aligned cylindrical vessel having an interior space. The cylindrical vessel has a shift inlet 302 at a top end of the vessel and a shift outlet 324 at a bottom end. As the reformer effluent enters the shift inlet 302 the reformer effluent is passed to a first water spray zone 304 containing a water spray nozzle 304' wherein the reformer effluent is contacted with a first water spray which introduced in line 310 to cool the effluent gases to effective high temperature shift reaction conditions prior to passing the first effluent water admixture to the high temperature shift reaction zone 308 and to produce a first effluent water admixture. The water spray nozzle 304' may be located within the interior space or below the shift inlet 302. The first effluent water admixture is passed to a first dispersion zone 306 to provide more complete dispersion of the water in the effluent gases. The high temperature shift reaction zone 308 contains a high temperature shift catalyst to produce a high temperature shift reactor effluent. The high temperature shift reactor effluent is passed to a second water spray zone 314 having a second water spray nozzle 314' to provide a second water effluent admixture to introduce more water via line 312 to cool the high temperature shift reactor effluent to effective low temperature shift reaction conditions. The second water effluent admixture is passed to a second dispersion zone 316 to provide uniform water distribution and then to the low temperature shift reaction zone 318. In the low temperature shift reaction zone 318 water or other coolant is passed through a coil 322 in fluid communication with a water inlet 320 and a water outlet 326 only in the event that the temperature rise across the low temperature shift reaction zone 318 exceeds a desired margin such as 70° C. This provides a means of maintaining the conversion of the low temperatures shift reaction zone 318 and the longevity of the catalyst therein, independent of the operation of the high temperature shift reaction zone 308. The use of spray cooling as disclosed above reduces the process thermal efficiency since the high-temperature heat contained in the hot gases entering the shift reaction zones is used to vaporize water and can only be recovered at the condensation temperature of the mixed stream thereby formed, which is too low for useful recovery. Although contrary to thermodynamic efficiency, the process has the advantages that heat transfer is very rapid, the cost of equipment is greatly reduced compared with heat recovery by indirect heat transfer, and the amount of water carried by the gas is increased, which processes the conversion of the shift reactors and the process hydrogen yield. The hydrogen product stream comprising hydrogen and less than about 3000 ppm-mol carbon monoxide is recovered via shift outlet 324 and shift outlet conduit 328. Preferably, the hydrogen product stream is saturated with water. Preferably, a temperature difference between an inlet and an outlet temperature of the low temperature shift reactor is maintained at less than about 70 Celsius degrees. This maintains a means of maintaining the conversion of the low temperatures shift reaction zone 318 and the longevity of the catalyst therein, independent of the operation of the high temperature shift reaction zone 308. The use of spray cooling as disclosed above reduces the process thermal efficiency since the high-temperature heat contained in the hot gases entering the shift reaction zones is used to vaporize water and can only be recovered at the condensation temperature of the mixed stream thereby formed, which is too low for useful recovery. Although contrary to thermodynamic efficiency, the process has the advantages that heat transfer is very rapid, the cost of equipment is greatly reduced compared with heat recovery by indirect heat transfer, and the amount of water carried by the gas is increased, which processes the conversion of the shift reactors and the process hydrogen yield. The hydrogen product stream comprising hydrogen and less than about 3000 ppm carbon monoxide is recovered via shift outlet 324 and shift outlet conduit 328. Preferably, the hydrogen product stream is saturated with water.

EXAMPLES

Example I

To prevent plume formation in the steam reforming zone, it is necessary to heat the exhaust gas to a sufficient temperature to provide time for dispersion of the gas into the ambient air before the gas cools to the dew point. The degree to which plume formation is likely can thus be measured by the temperature difference between the exhaust gas temperature and the dew point temperature. Table 3 shows that if the cathode waste gas is discharged directly, separate from the burner exhaust gas, then a plume forms. If the cathode waste gas is mixed with the exhaust gas leaving the heat recovery exchanger, then the temperature difference between the dew point and the exhaust temperature is raised to 15 C; however, if less than about 15% of the cathode waste gas is fed to the process burner, then the temperature difference is increased to 18 C, which provides a greater margin for dispersion and consequent reduction of plume formation.

TABLE 3

CATHODE WASTE GAS ALTERNATIVES

| MOLAR COMPO- SITION (%) | CATHODE WASTE GAS (CWG) | EXHAUST GAS WITHOUT CWG | EXHAUST GAS WITH ALL CWG BLENDED AT EXIT | EXHAUST GAS WITH 15% OF CWG IN BURNER, BALANCE BLENDED AT EXIT |
|---|---|---|---|---|
| N2 | 46.6 | 62.4 | 51.8 | 49.3 |
| O2 | 6.4 | 4.3 | 5.7 | 4.5 |
| H2O | 47.0 | 22.7 | 39.0 | 42.4 |
| CO2 | 0.0 | 10.6 | 3.4 | 3.7 |
| EXHAUST TEMP (C.) | 80 | 220 | 90 | 95.4 |
| DEW POINT (C.) | 80 | 65 | 75 | 77 |
| T-T$_D$ | 0 | 155 | 18 | 18 |

Example II

Figure 5:
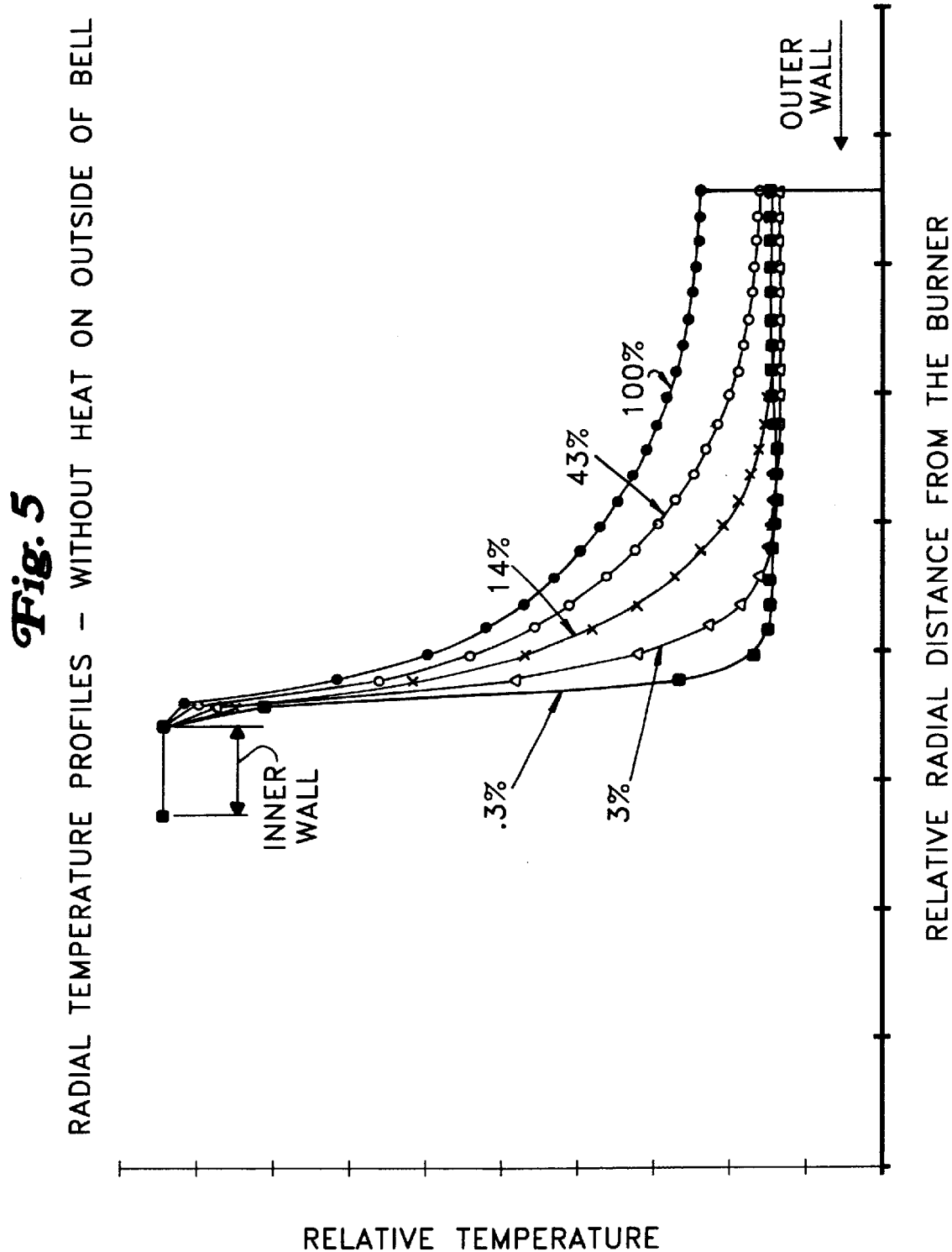
FIG. 5 is a chart showing calculated radial temperature profiles of the prior art.

The performance of the bell-shaped reaction zone wherein the exterior and interior walls of the bell-shaped reaction zone are heated by convection with the burner exhaust gases and radiation from the burner flame is compared to a typical steam reforming reaction zone which is heated from only one side. The flue gas temperature of the flue exhaust gases providing heat to the interior wall is about 800° C. The interior wall of each reactor which is closest to the burner is located about 0.15 meters, radially from the burner and the catalyst bed width is a constant value over the entire length of the catalyst zone. Radial temperature profiles are developed at about 0.3, 3, 14, 43 and 100 percent of the length of the catalyst bed. The fuel/water admixture is passed to the catalyst zone at about 800° C. and a pressure of about 2 bars with a steam to methane ratio of about 3, and a gas space velocity of about 2000 cubic meters of gas per cubic meters of catalyst per hour. The burner side of the interior wall is about 900° C. and the exhaust gas temperature is about 800° C. The methane conversion for the catalyst zone heated from two sides is about 99% and the methane conversion for a catalyst zone heated from only one side is about 61 percent. The results of the comparison are shown in FIG. 5 for the reaction zone heated on one side and in FIG. 6 for the reaction zone heated on both the exterior and interior walls. Clearly, in FIG. 5, the reactor outlet temperature does not approach the inlet temperature as the feed is introduced to the endothermic reaction zone and results in a lower methane conversion. In FIG. 6, as the distance from the entrance of the reaction zone increases, the radial temperature in the bell-shaped reaction zone approaches a more uniform radial temperature profile with the temperature at the outer, or exterior, wall approaching the temperature of the interior wall. Table 4 shows the comparison of the average temperature of the effluent in the reactor at corresponding points throughout the reactor bed. Clearly, when the outlet temperature of the catalyst zone approaches the inlet temperature, the methane conversion is high and the methane slippage is significantly reduced.

TABLE 4

COMPARISON OF CATALYST ZONE TEMPERATURES

| LENGTH FROM INLET OF BED, % | HEATING 2 SIDES | HEATING 1 SIDE |
|---|---|---|
| 0.3 | 512 | 506 |
| 3 | 542 | 515 |
| 14 | 611 | 538 |
| 43 | 698 | 566 |
| 100 (OUTLET) | 804 | 602 |

Example III

The operation of the water gas shift reactor (WGSR) of the present invention as shown in FIG. 2 was simulated to illustrate the operating of the reactor processing a feed stream produced by a steam reforming reactor. The results of the engineering simulation are shown in Table 5. A reforming effluent stream, or water gas shift feed stream, characterized as having about 56 mol-% hydrogen, about 10 to about 12 mol-% carbon monoxide, and having a reformer outlet temperature of about 750° C., is first cooled by direct contact with a first water stream at a water temperature of about 15 to about 40° C. in a first water spray zone to an effective high temperature shift reaction temperature of about 450° C. The molar ratio of the feedstream to the first water spray is about 6:1, but could vary in a conventional manner depending upon the water temperature. The water/feedstream admixture is passed to a first dispersion zone to disperse the water in the water/feedstream admixture to avoid damage to the high temperature shift catalyst in the high temperature shift reaction zone should cold water contact the catalyst. The effluent from the high temperature shift zone which exits the high temperature shift reaction zone at a high temperature shift effluent temperature of about 475° C. is contacted with a second water spray stream at a temperature of about 15° C. to form a second admixture. The molar ratio of the high temperature shift effluent stream to the second water spray stream is about 5:1. This second admixture is passed to a second dispersion zone. The dispersed second admixture is passed to a low temperature shift reaction zone at a low temperature shift reaction temperature of about 200° C. to further reduce the carbon monoxide to a level less than about 3000 ppm-mol. In this Example III, the carbon monoxide in the low temperature shift effluent stream is about 2500 ppm-mol and the low temperature shift effluent, or outlet temperature is about 250° C.

TABLE 5

OPERATION OF WATER GAS SHIFT REACTOR

| | Steam Reforming Effluent | First Water Spray Stream | High Temperature Shift Effluent | Second Water Spray Stream | Low Temperature Shfit Effluent |
|---|---|---|---|---|---|
| Temperature, ° C. | 750 | 15 | 475 | 15 | 250 |
| Pressure, kPa | 150 | 190 | 145 | 190 | 140 |
| Composition, mol-% | | | | | |

TABLE 5-continued

OPERATION OF WATER GAS SHIFT REACTOR

| | Steam Reforming Effluent | First Water Spray Stream | High Temperature Shift Effluent | Second Water Spray Stream | Low Temperature Shfit Effluent |
|---|---|---|---|---|---|
| Hydrogen | 55.6 | | 49.7 | | 47.1 |
| Carbon Monoxide | 10.2 | | 6.3 | | 0.255 |
| Carbon Dioxide | 6.3 | | 7.68 | | 11.6 |
| Methane | 0.27 | | 0.23 | | 0.19 |
| Water | 27.7 | 100 | 36.1 | 100 | 40.9 |

We claim:

1. An apparatus for a compact water gas shift reaction zone for removing carbon monoxide from a hydrogen stream in the production of electric power from a fuel cell, said apparatus comprising:

a) a vertically aligned vessel having a top end, a bottom end opposite, and defining an interior space, said vertically aligned cylindrical vessel defining a shift inlet the top end, and a shift outlet at the bottom end;

b) a first water spray nozzle in communication with a first water supply conduit and located within said interior space for contacting the hydrogen stream with a first water stream;

c) a first dispersion material retained in said interior space disposed below said first water spray nozzle to define the bottom of a first water spray zone, said first dispersion material defining a first dispersion zone disposed directly on a high temperature shift reaction zone, which is the high temperature shift reaction zone closest to the top end of the vessel, said first dispersion zone being in fluid communication with said water spray zone to disperse the first water stream into the hydrogen stream toward the foist dispersion zone;

d) a first fluid permeable portion defining a bottom of the high temperature shift reaction zone in the interior space disposed below the first dispersion zone and in fluid communication with the first dispersion zone, said high temperature shift zone containing a high temperature shift catalyst to produce a high temperature shift effluent stream;

e) a second water spray zone in fluid communication with the high temperature shift reaction zone and defined by a portion of the interior space disposed below the high temperature shift reaction zone, the second water spray zone containing a second water spray nozzle in fluid communication with a second water supply conduit to contact the high temperature shift effluent stream with a second water stream;

f) a second dispersion zone material retained in the interior space below said second water spray zone in fluid communication with the second water spray zone to define a second dispersion zone disposed directly on a low temperature shift zone for dispersing the second water spray stream into the high temperature shift effluent stream toward the second dispersion zone; and, g) the low temperature shift zone in fluid communication with the second dispersion zone defined by a portion of the interior space below the second dispersion zone and above said shift outlet, said low temperature shift zone containing a low temperature shift catalyst to produce a water saturated hydrogen product stream.

2. The apparatus of claim 1 wherein the first dispersion zone and the second dispersion zone comprises dispersion material selected from the group consisting of sand, quartz, glass and mixtures thereof.

3. The apparatus of claim 1 wherein the first fluid permeable portion comprises a screen.

4. The apparatus of claim 1 wherein the first fluid permeable portion comprises stainless steel.

5. The apparatus of claim 1 wherein the first water spray nozzle is located below the shift inlet.

6. The apparatus of claim 1 further comprising disposing a heat exchanger coil in said low temperature shift zone, said heat exchanger coil being in fluid communication with a third water inlet and a water outlet to reduce a low temperature shift zone temperature when a temperature difference between an inlet and an outlet temperature of the low temperature shift zone is greater than or equal to about 70° C.

7. An apparatus for a compact water gas shift reaction zone for removing carbon Monoxide from a hydrogen stream in the production of electric power from a fuel cell, said apparatus comprising:
   a) a vertically aligned vessel having a top end, a bottom end opposite, and defining an interior spaces, said vertically aligned cylindrical vessel defining a shift inlet at the top end, and a shift outlet at the bottom end;
   b) a first water spray nozzle in communication with a first water supply conduit and located within said interior space for contacting the hydrogen stream with a first water stream;
   c) a fires dispersion material retained in said interior space disposed below said first water spray nozzle to define the bottom of a first water spray zone, said first dispersion material defining a first dispersion zone disposed above a high temperature shift reaction zone, which is the high temperature shift reaction zone closest to the top end of the vessel, said first dispersion zone being in fluid communication with said water spray zone to disperse the first water stream into the hydrogen stream toward the first dispersion zone;
   d) a first fluid permeable portion defining a bottom of the high temperature shift reaction zone in the interior space disposed below the first dispersion zone and in fluid communication with the first dispersion zone, said high temperature shift zone containing a high temperature shift catalyst to produce a high temperature shift effluent stream;
   e) a second water spray zone in fluid communication with the high temperature shift reaction zone and defined by a portion of the interior space disposed below the high temperature shift reaction zone, the second water spray zone containing a second water spray nozzle in fluid communication with a second water supply conduit to contact the high temperature shift effluent stream with a second water stream;
   f) a second dispersion zone material retained in the interior space below said second water spray zone In fluid communication with the second water spray zone to define a second dispersion zone disposed above a low temperature shift zone for dispersing the second water spray stream into the high temperature shift effluent stream toward the second dispersion zone; and
   g) the low temperature shift zone in fluid communication with the second dispersion zone defined by a portion of the interior space below the second dispersion zone and above said shift outlet, said low temperature shift zone containing a low temperature shift catalyst to produce a water saturated hydrogen product stream.

8. An apparatus for a compact water gas shift reaction zone for removing carbon monoxide from a hydrogen stream in the production of electric power from a fuel cell, said apparatus comprising:
   a) a vertically aligned vessel having a top end, a bottom end opposite, and defining an interior space, said vertically aligned cylindrical vessel defining a shift inlet at the top end, and a shift outlet at the bottom end;
   b) a first water spray nozzle in communication with a first water supply conduit and located within said interior space for contacting the hydrogen stream with a first water stream;
   c) a first dispersion material retained in said interior space disposed below said first water spray nozzle to define the bottom of a first water spray zone, said first dispersion material defining as first dispersion zone disposed on a high temperature shift reaction zone, which is the high temperature shift reaction zone closest to the top end of the vessel, said first dispersion zone being in fluid communication with said water spray zone to disperse the first water stream into the hydrogen stream toward the first dispersion zone;
   d) a first fluid permeable portion defining a bottom of the high temperature shift reaction zone in the interior space disposed below the first dispersion zone and in fluid communication with the first dispersion zone, said high temperature shift zone containing a high temperature shift catalyst to produce a high temperature shift effluent stream;
   e) a second water spray zone in fluid communication with the high temperature shift reaction zone and defined by a portion of the interior space disposed below the high temperature shift reaction zone, the second water spray zone containing a second water spray nozzle in fluid communication with a second water supply conduit to contact the high temperature shift effluent stream with a second water stream;
   f) a second dispersion zone material retained in the interior space below said second water spray zone in fluid communication with the second water spray zone to define a second dispersion zone disposed on a low temperature shift zone for dispersing the second water spray stream into the high temperature shift effluent stream toward the second dispersion zone; and
   g) the low temperature shift zone in fluid communication with the second dispersion zone defined by a portion of the interior space below the second dispersion zone and above said shift outlet, said low temperature shift zone containing a low temperature shift catalyst to produce a water saturated hydrogen product stream.

* * * * *